(12) United States Patent
Coleman et al.

(10) Patent No.: US 6,386,149 B1
(45) Date of Patent: *May 14, 2002

(54) METHOD OF OPERATING AN ENGINE WITH A MIXTURE OF GASEOUS FUEL AND EMULSIFIED PILOT FUEL TO REDUCE NITROGEN OXIDE EMISSIONS

(75) Inventors: Gerald N. Coleman, Peoria; Richard A. Cemenska, Eldenstein, both of IL (US); Martin L. Willi, Lafayette, IN (US); Ted W. Sheuermann, Peoria, IL (US)

(73) Assignee: Clean Fuel Technology, Inc., Reno, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,527

(22) Filed: May 11, 1999

Related U.S. Application Data

(63) Continuation of application No. 09/025,528, filed on Feb. 18, 1998.

(51) Int. Cl.⁷ .............................................. F02B 47/00
(52) U.S. Cl. ............................... 123/25 C; 123/27 GE; 123/299
(58) Field of Search .......................... 123/25 A, 25 C, 123/27 GE, 299, 300, 304, 526

(56) References Cited

U.S. PATENT DOCUMENTS

| | | | |
|---|---|---|---|
| 4,463,734 A | 8/1984 | Akeroyd | 123/525 |
| 4,597,364 A | 7/1986 | Young | 123/27 GE |
| 4,876,988 A | 10/1989 | Paul et al. | 123/1 A |
| 4,955,326 A | 9/1990 | Helmich | 123/27 |
| 5,035,206 A | 7/1991 | Welch et al. | 123/27 |
| 5,224,457 A | 7/1993 | Arsenault et al. | 123/526 |
| 5,243,932 A | 9/1993 | Herrmann | 123/25 E |
| 5,271,370 A | 12/1993 | Shimada et al. | 123/568 |
| 5,344,306 A | 9/1994 | Brown et al. | 431/4 |
| 5,453,257 A | 9/1995 | Diep et al. | 423/235 |
| 5,526,786 A | 6/1996 | Beck et al. | 123/357 |
| 5,542,379 A | 8/1996 | Kessler | 123/25 C |
| 5,584,894 A | 12/1996 | Peter-Hoblyn et al. | 44/301 |
| 5,682,842 A | 11/1997 | Coleman et al. | 123/25 C |

FOREIGN PATENT DOCUMENTS

| | | | |
|---|---|---|---|
| EP | 0313086 A1 | 4/1989 | F02M/25/02 |
| EP | 0509372 A1 | 10/1992 | F02M/25/02 |
| EP | 0553364 A1 | 8/1993 | F02M/43/00 |

*Primary Examiner*—John Kwon
(74) *Attorney, Agent, or Firm*—Sierra Patent Group, Ltd.

(57) ABSTRACT

Reduction of nitrogen oxide emissions during operation of an engine is achieved by using a fuel mixture therein which includes a gaseous fuel and an emulsified pilot fuel. The method includes the steps of (i) advancing air into a combustion chamber of the engine, (ii) advancing a gaseous fuel into the combustion chamber, (iii) injecting an emulsified pilot fuel into the combustion chamber, wherein the emulsified pilot fuel includes water and liquid fuel, and (iv) compressing a mixture which includes (A) the air, (B) the gaseous fuel, and (C) the emulsified pilot fuel within the combustion chamber during a compression stroke of the engine, whereby heat generated by compression of the mixture causes the emulsified pilot fuel to combust so as to ignite the gaseous fuel.

13 Claims, 3 Drawing Sheets

METHOD OF OPERATING AN ENGINE WITH A MIXTURE OF GASEOUS FUEL AND EMULSIFIED PILOT FUEL TO REDUCE NITROGEN OXIDE EMISSIONS

This application is a continuation of co-pending application Ser. No. 09/025,528, filed on Feb. 18, 1998.

TECHNICAL FIELD OF THE INVENTION

The present invention relates generally to a method of operating an engine, and more particularly to a method of reducing nitrogen oxide emission during operation of an engine by using a fuel mixture therein which includes a gaseous fuel and an emulsified pilot fuel.

BACKGROUND OF THE INVENTION

Engines capable of operating on two different types of fuels are referred to as dual fuel engines. One type of dual fuel engine is a diesel engine designed to have two operating modes. Specifically, in the first mode of operation the diesel engine is run on diesel fuel alone. In the second mode of operation the diesel engine utilizes natural gas as the primary fuel and the natural gas is ignited by a diesel pilot fuel within the combustion chamber of the engine.

Operating the engine with a mixture of natural gas and diesel pilot fuel provides a number of advantages as compared to operating the engine with diesel fuel alone. For example, a mixture of natural gas and diesel pilot fuel is less expensive than a comparable amount of diesel fuel alone. Therefore, operating the engine with a natural gas/diesel pilot fuel mixture is less expensive as compared to operating the engine with diesel fuel alone.

Another advantage of operating the engine with a mixture of natural gas and diesel pilot fuel is that combustion of a natural gas/diesel pilot fuel mixture results in a smaller amount of nitrogen oxides ($NO_x$) being produced as compared to combustion of a comparable amount of diesel fuel alone. Thus, operating the engine with a natural gas/diesel pilot fuel mixture results in less $NO_x$ being produced as compared to operating the engine with diesel fuel alone.

While the use of a natural gas/diesel pilot fuel mixture in the operation of an engine provides the significant advantages mentioned above, such use still results in the production of $NO_x$, albeit a substantially reduced amount. It is a known goal to reduce the production of $NO_x$ as much as possible. Thus, it would be desirable to even further reduce the production of $NO_x$ which results from the operation of an engine.

DISCLOSURE OF THE INVENTION

In accordance with a first embodiment of the present invention, there is provided a method of reducing production of nitrogen oxides during operation of an engine, with the engine having a combustion chamber. The method includes the steps of (i) advancing air into the combustion chamber, (ii) advancing a gaseous fuel into the combustion chamber, (iii) injecting an emulsified pilot fuel into the combustion chamber, wherein the emulsified pilot fuel includes water and liquid fuel, and (iv) compressing a mixture which includes (A) the air, (B) the gaseous fuel, and (C) the emulsified pilot fuel within the combustion chamber during a compression stroke of the engine, whereby heat generated by compression of the mixture causes the emulsified pilot fuel to combust so as to ignite the gaseous fuel.

In accordance with a second embodiment of the present invention, there is provided a method of reducing production of nitrogen oxides during operation of an engine, with the engine having a combustion chamber. The method includes the steps of (i) advancing air and a gaseous fuel into the combustion chamber during an air intake stroke of the engine, (ii) injecting an emulsified pilot fuel into the combustion chamber during a compression stroke of the engine, wherein the emulsified pilot fuel includes water and diesel fuel, and (iii) compressing a mixture which includes (A) the air, (B) the gaseous fuel, and (C) the emulsified pilot fuel within the combustion chamber during the compression stroke of the engine, whereby heat generated by compression of the mixture causes the emulsified pilot fuel to combust so as to ignite the gaseous fuel.

BEST MODE FOR CARRYING OUT THE INVENTION

Figure 1:
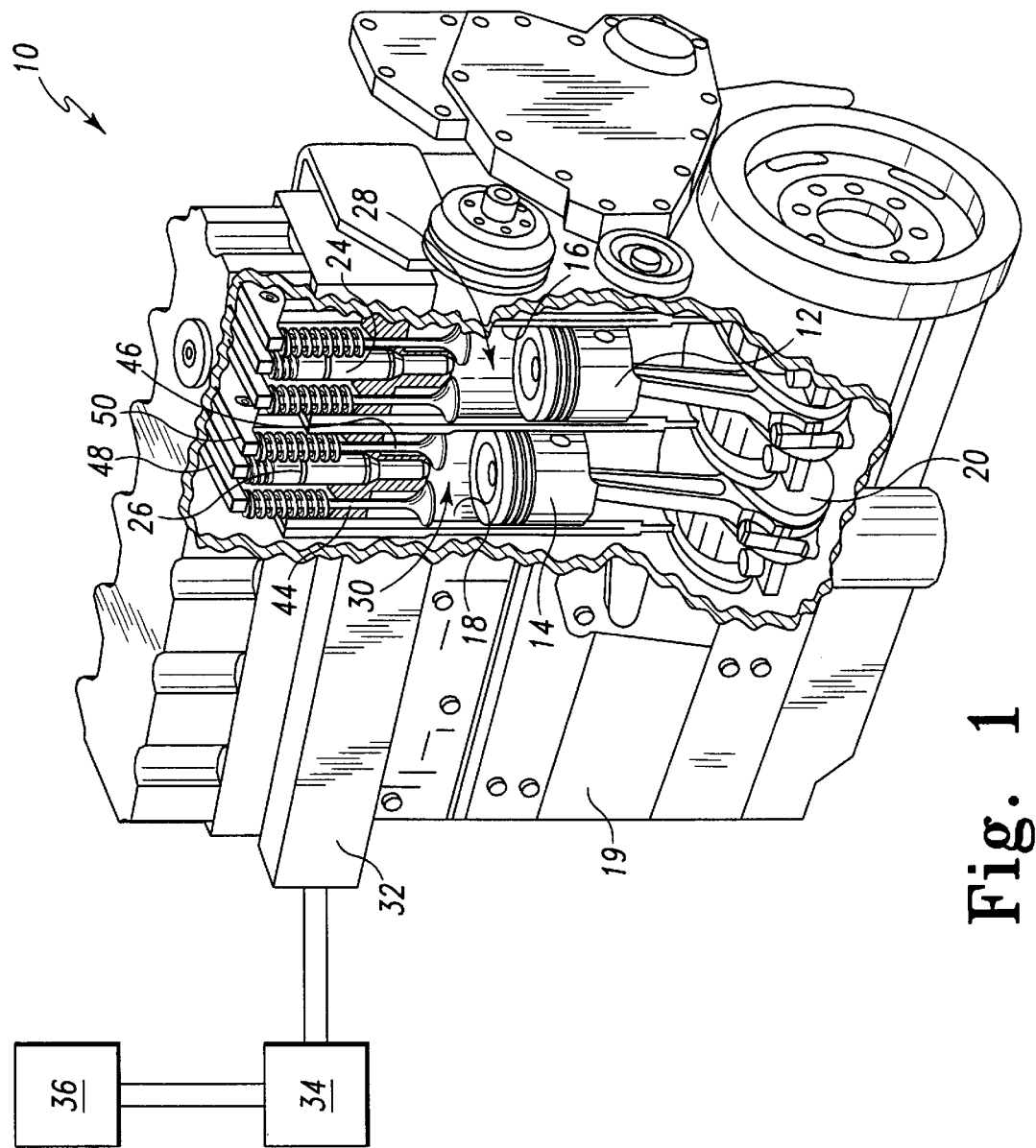
FIG. 1 is a fragmentary perspective view of a diesel engine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a diesel engine 10. Diesel engine 10 includes a number of pistons 12, 14, and a crankshaft 20 operatively coupled to each of the pistons 12, 14. The pistons 12, 14 are respectively positioned in a number of cylinders 16, 18 defined in an engine block 19 of the diesel engine 10. Cylinder 16 defines a combustion chamber 28 while cylinder 18 defines another combustion chamber 30. It should be appreciated that although only two pistons (i.e. the pistons 12, 14) and two cylinders (i.e. cylinders 16 and 18) are shown in FIG. 1, the diesel engine 10 further includes four additional pistons which are respectively positioned in four additional cylinders which are not shown in FIG. 1 for clarity of description. It should also be appreciated that the cylinders not shown also have the components described below operatively associated therewith.

Diesel engine 10 further includes a number of fuel injectors 24, 26. Fuel injector 24 is operatively associated with cylinder 16, whereas fuel injector 26 is operatively associated with the cylinder 18. Fuel injectors 24, 26 are electrically coupled to an engine control module (not shown) in order to control injection of an emulsified pilot fuel 38 (see FIG. 2) into combustion chambers 28 and 30.

The emulsified pilot fuel 38 includes water and liquid fuel. Preferably, the liquid fuel is diesel fuel. Moreover, in order to provide meaning to the term "water" as it is used in this document, the term "water" is used to mean a quantity of water in a mixture wherein the weight percentage of water in the mixture is more than a deminimis amount which would normally occur in a liquid (such as diesel fuel alone) as a result of the liquid being exposed to its ambient surroundings during processing, transportation, and use thereof. For example, the emulsified pilot fuel 38 is preferably an emulsion of water in diesel fuel at a water to fuel ratio of about X % water by weight, where 5<X<60, and more preferably where 10<X<50. Preferably, the emulsified pilot fuel 38 has the diesel fuel as the continuous phase and the water as the discontinuous phase. However, some of the advantages of the present invention can be achieved by having the water as the continuous phase and the diesel fuel as the discontinuous phase. Moreover, the emulsified pilot fuel 38 may include any appropriate emulsifying agent. One example of an emulsified pilot fuel which may be used as emulsified pilot fuel 38 in the present invention is disclosed in U.S. Pat. No. 5,873,916 which issued on Feb. 23, 1999, entitled "Fuel Emulsion Blending System", by Gerald Coleman, Ed Jakush, Carlos Cortes, and Richard Cemenska, the disclosure of which is hereby incorporated by reference.

Figure 2:
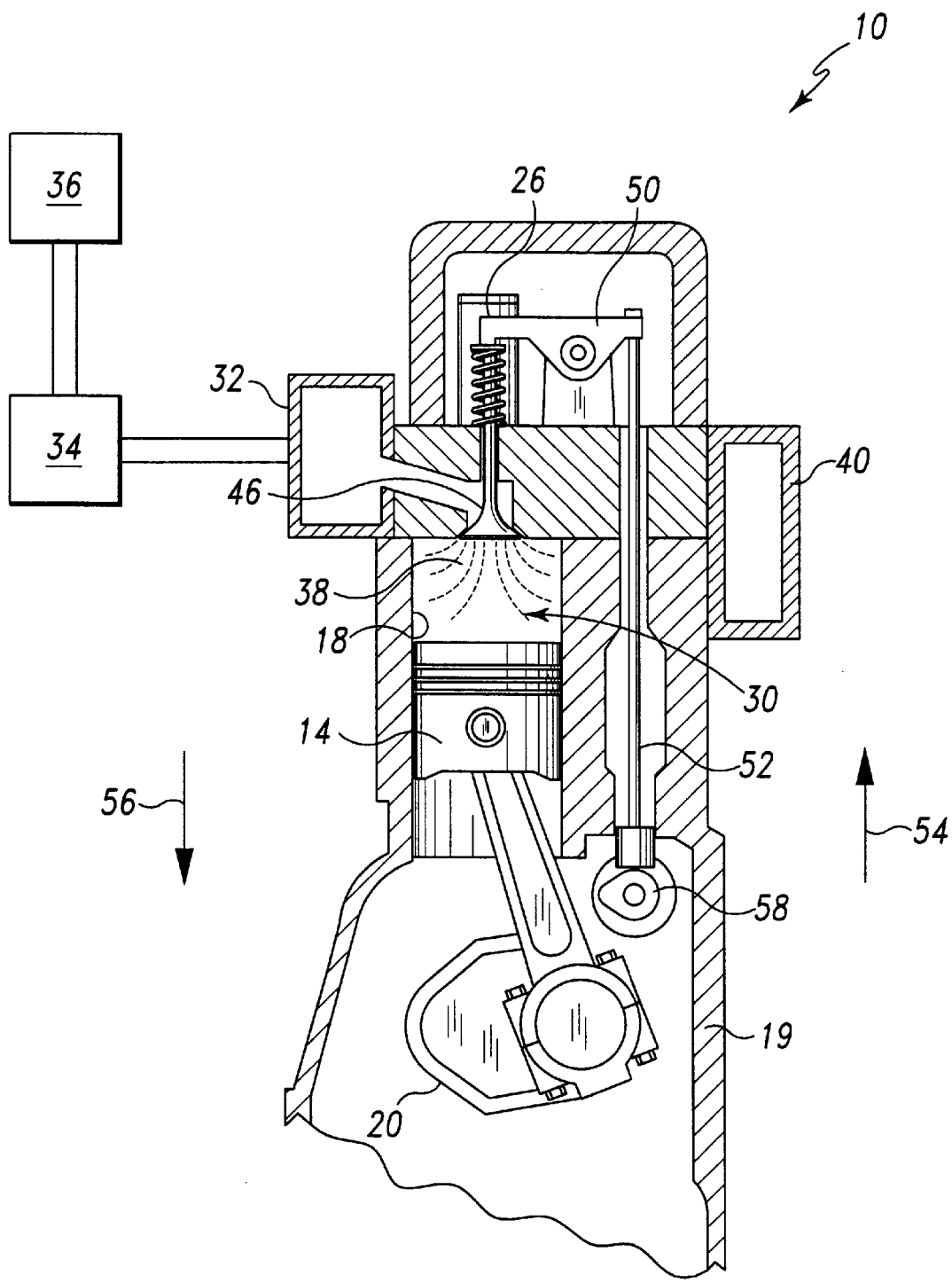
FIG. 2 is a cross sectional view of the diesel engine shown in FIG. 1, schematically showing the air intake conduit of the diesel engine in fluid communication with the gas admission valve and the gas supply (note that the piston, the crank shaft, the valve assembly, the injector, and the rocker arm are not shown in cross section for clarity of description)

Diesel engine 10 also includes a number of valves 44 and 46, rocker arms 48 and 50, and push rods 52 (only one shown in FIG. 2). Valves 44 and 46, rocker arms 48 and 50, and push rods 52 (see FIG. 2) are operatively associated with cylinder 18. It should be understood that cylinder 16 also has a pair of valves, rocker arms, and push rods operatively associated therewith.

Referring now to FIG. 2, diesel engine 10 also includes an air intake conduit 32 which is in fluid communication with cylinder 18. Diesel engine 10 also includes an exhaust conduit 40 which is in fluid communication with cylinder 18. It should be understood that both air intake conduit 32 and exhaust conduit 40 are also in fluid communication with the cylinder 16 and the cylinders not shown. Diesel engine 10 also includes a supply of gaseous fuel 36 (hereinafter referred to as "gas supply" 36). Preferably, the gaseous fuel contained in the gas supply 36 includes natural gas. A gas admission valve 34 is interposed between air intake conduit 32 and gas supply 36 such that gas admission valve 34 is in fluid communication with gas supply 36 and air intake conduit 32. Gas admission valve 34 places gas supply 36 in fluid communication with air intake conduit 32. Specifically, gas admission valve 34 selectively allows gaseous fuel to advance from gas supply 36 to air intake conduit 32 so as to create a mixture of air and the gaseous fuel in air intake conduit 32. It should be understood that diesel engine 10 may have a single gas admission valve 34 as described above, or several gas admission valves 34. In the situation where diesel engine 10 includes several gas admission valves 34, each one is in fluid communication with one cylinder (e.g. cylinder 18) so as to advance gaseous fuel into the cylinder thereby forming a mixture of air and gaseous fuel.

While the following description is directed only to cylinder 18, it should be appreciated that such description applies to each of the other cylinders (e.g. cylinder 16) included in diesel engine 10.

Diesel engine 10 is a four stroke engine. The first stroke is an intake stroke in which rotation of a cam 58 drives push rod 52 in a direction indicated by arrow 54. Driving push rod 52 in the direction indicated by arrow 54 causes rocker arm 48 to pivot and push valve 46 in a direction indicated by arrow 56. Pushing valve 46 in the direction indicated by arrow 56 places cylinder 18 in fluid communication with air intake conduit 32 such that the mixture of air and the gaseous fuel are advanced into cylinder 18 (and therefore combustion chamber 30). Near the end of the intake stroke valve 46 is closed such that cylinder 18 is no longer in fluid communication with air intake conduit 32.

Diesel engine 10 then advances to a compression stroke where crankshaft 20 causes piston 14 to travel in the direction indicated by arrow 54 which causes the air and gaseous fuel mixture to be compressed in cylinder 18. Near the end of the compression stroke, the engine control module (not shown) generates an output signal thereby actuating fuel injector 26 so as to inject emulsified pilot fuel 38 into cylinder 18. Preferably, emulsified pilot fuel 38 is injected into cylinder 18 when crank shaft 20 is positioned at about 21° before top dead center during the compression stroke. (Note that the space is exaggerated in FIG. 2 between the piston 14 and the upper wall of cylinder 18 during injection of emulsified pilot fuel 38 from fuel injector 26 for clarity of description.) Injection of emulsified pilot fuel 38 into cylinder 18 creates a mixture within cylinder 18 which includes (i) air, (ii) gaseous fuel (originating from gas supply 36), and (iii) emulsified pilot fuel 38. Near the end of the compression stroke, the heat generated as a result of compressing the aforementioned mixture causes emulsified pilot fuel 38 to combust. Combustion of emulsified pilot fuel 38 causes the gaseous fuel to ignite. Ignition and then subsequent combustion of the gaseous fuel advances diesel engine 10 to a power stroke.

It should be appreciated that the quantity of emulsified pilot fuel 38 injected into cylinder 18 by fuel injector 26 contributes about 1% to about 10% of the total amount of energy released by the combustion of the combination of the gaseous fuel and the emulsified pilot fuel 38 in combustion chamber 30 of cylinder 18. The volume of emulsified pilot fuel 38 injected into cylinder 18 by fuel injector 26 may equal about 1% to about 20% of the maximum volume of liquid fuel that fuel injector 26 can inject.

Combustion of the emulsified pilot fuel 38 and the gaseous fuel cause exhaust gases to be formed in the combustion chamber 30. During the power stroke, the piston 14 is driven in the direction indicated by arrow 56 by the exhaust gases so as to rotate crankshaft 20.

Thereafter, diesel engine 10 is advanced to an exhaust stroke in which another push rod (not shown) is actuated by a cam (not shown) so as to open valve 44 (see FIG. 2) and place cylinder 18 in fluid communication with exhaust conduit 40. The exhaust gases formed from the combustion of the gaseous fuel and emulsified pilot fuel 38 are then advanced from cylinder 18 to exhaust conduit 40 by the movement of piston 14 in the direction indicated by arrow 54 during the exhaust stroke. Near the end of the exhaust stroke valve 44 is closed so that cylinder 18 is no longer in fluid communication with exhaust conduit 40.

Collectively, the intake stroke, the compression stroke, the power stroke, and the exhaust stroke are included in one engine cycle of diesel engine 10. Once the exhaust stroke is completed, the intake stroke is repeated to initiate another engine cycle.

INDUSTRIAL APPLICABILITY

Utilizing emulsified pilot fuel 38 to ignite the gaseous fuel within cylinder 18 significantly reduces the amount of $NO_x$ emissions produced by diesel engine 10 as compared to igniting the gaseous fuel with a pilot injection of diesel fuel alone. For example, a model 3601 diesel engine (available from Caterpillar Inc. of Peoria, Ill.) was tested to compare the amount of $NO_x$ produced when igniting natural gas contained in the combustion chamber thereof with each of the following two pilot fuels: (1) an emulsified pilot fuel which includes an emulsion of water in diesel fuel at a water to fuel ratio of about 50% water by weight (hereinafter "emulsified pilot fuel"), and (2) a non-emulsified pilot fuel which includes diesel fuel alone (hereinafter "diesel pilot fuel").

Specifically, the 3601 diesel engine was run at 1000 rpm and had a brake mean effective pressure of 2047 kPa. It should be understood that the 3601 diesel engine has a single cylinder which defines a single combustion chamber. The cylinder and combustion chamber of the 3601 diesel engine are similar to cylinder 18 and combustion chamber 28 described above. In addition, the 3601 diesel engine includes a fuel injector, similar to fuel injector 26 described above, which is operatively associated with the cylinder and the combustion chamber.

The 3601 diesel engine was mechanically coupled to a dynamometer in order to obtain the brake specific amount of $NO_x$ produced over a range of excess air ratios. An "excess air ratio" is the amount of air actually advanced into the combustion chamber of the diesel engine divided by the theoretical amount of air required in the combustion chamber to combust a certain quantity of hydrocarbon fuel contained therein completely to $CO_2$ and $H_2O$. For example, an excess air ratio of 2.0 means that the combustion chamber contains twice as much air that is theoretically required to combust a certain quantity of hydrocarbon fuel contained therein completely to $CO_2$ and $H_2O$. It should be understood that the excess air ratio was manipulated by changing (i.e. increasing or decreasing) the amount of air advanced into the combustion chamber of the 3601 diesel engine.

Figure 3:
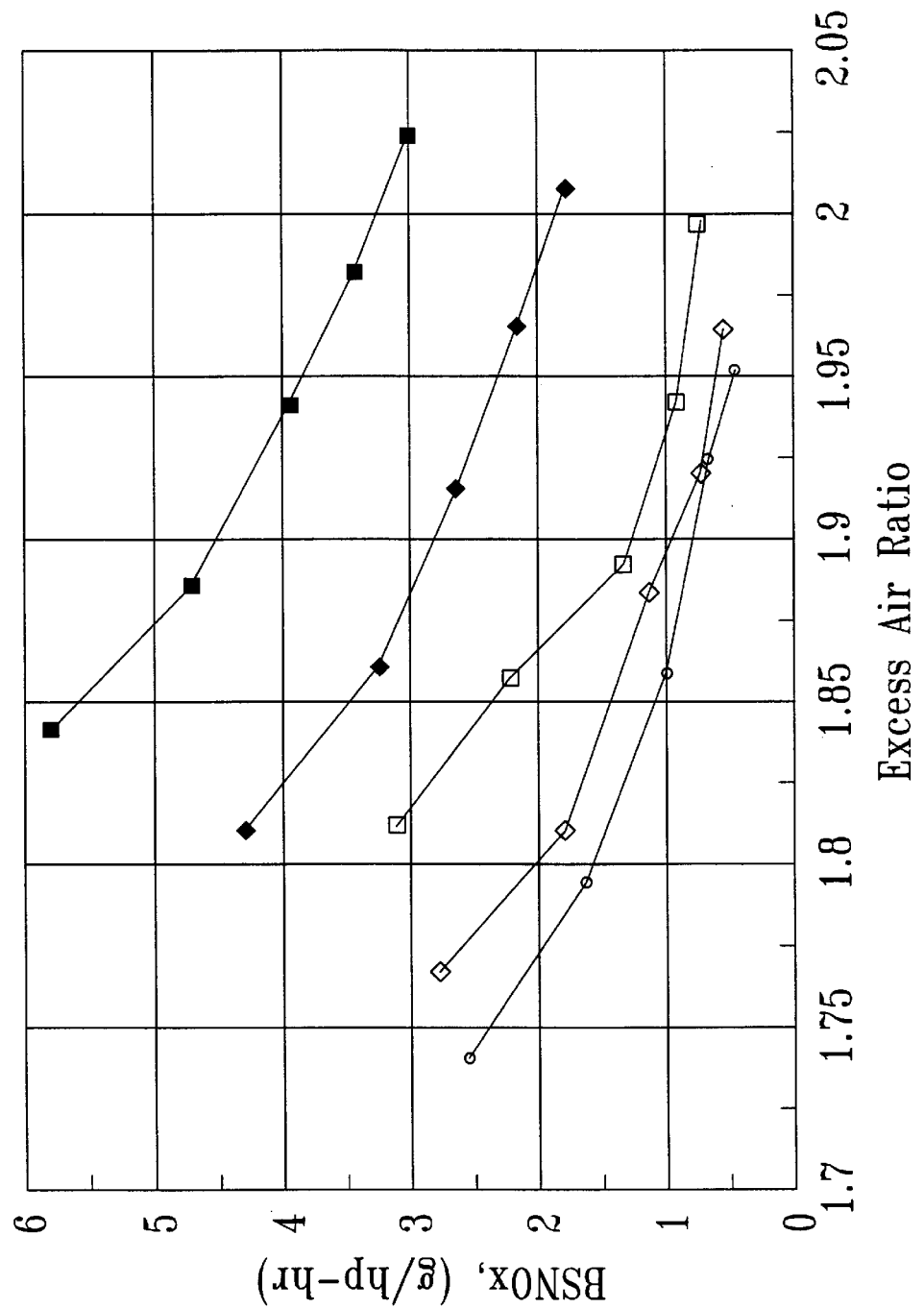
FIG. 3 is a graph illustrating a comparison of $NO_x$ production by a natural gas combusting engine (similar to the engine of FIG. 1) when an emulsified pilot fuel containing water and diesel fuel is used to ignite the natural gas versus when a non-emulsified pilot fuel containing diesel fuel alone is used to ignite the natural gas.

As shown in FIG. 3, the brake specific amount of $NO_x$ produced by the above described diesel engine (i.e. the 3601 diesel engine) was measured in grams per horsepower hour (i.e. g/hp-hr) when (i) igniting the natural gas fuel within the combustion chamber with the emulsified pilot fuel, and (ii) igniting the natural gas fuel within the combustion chamber with the diesel pilot fuel. The brake specific amount of $NO_x$ produced in items (i) and (ii) above was measured over a range of excess air ratios from about 1.7 to about 2.05.

Two tests were conducted on the diesel pilot fuel. In the first test, a 3% diesel pilot fuel (depicted by the symbol ■ in FIG. 3) was injected into the combustion chamber of the 3601 diesel engine so as to ignite the natural gas contained therein. What is meant herein by the phrase "3% diesel pilot fuel" is a quantity of the diesel pilot fuel injected into the cylinder by the fuel injector which contains about 3% of the total amount of energy released by combusting the 3% diesel pilot fuel and the natural gas in the combustion chamber of the 3601 diesel engine. This meaning applies to all of the percentage diesel pilot fuels (e.g. 2% diesel pilot fuel) referred to hereinafter.

The 3% diesel pilot fuel was tested over an excess air ratio range of about 1.84 to about 2.02. The results of the 3% diesel pilot fuel test are shown below in Table I:

TABLE I

| Excess Air Ratio | $BSNO_x$ (g/hp-hr) |
| --- | --- |
| 1.840 | 5.79 |
| 1.886 | 4.73 |
| 1.939 | 3.92 |

TABLE I-continued

| Excess Air Ratio | $BSNO_x$ (g/hp-hr) |
| --- | --- |
| 1.981 | 3.47 |
| 2.023 | 3.01 |

The data contained in Table I is graphically illustrated in FIG. 3. As illustrated by FIG. 3, the brake specific amount of $NO_x$ produced by the 3601 diesel engine showed a decreasing trend as the excess air ratio was increased. For example, the brake specific amount of $NO_x$ produced at an excess air ratio of about 1.84 is about 5.79 g/hp-hr as compared to about 3.01 g/hp-hr at an excess air ratio of about 2.023.

In the second test, a 2% diesel pilot fuel (depicted by the symbol ♦ in FIG. 3) was injected into the combustion chamber of the 3601 diesel engine so as to ignite the natural gas contained therein. The results of the 2% diesel pilot fuel test are shown below in Table II:

TABLE II

| Excess Air Ratio | $BSNO_x$ (g/hp-hr) |
| --- | --- |
| 1.813 | 4.33 |
| 1.862 | 3.27 |
| 1.918 | 2.62 |
| 1.964 | 2.14 |
| 2.006 | 1.81 |

The data contained in Table II is graphically illustrated in FIG. 3. In a manner similar to that discussed above with regard to the 3% diesel pilot fuel, the brake specific amount of $NO_x$ produced by the 3601 diesel engine with a 2% diesel pilot fuel also showed a decreasing trend as the excess air ratio was increased. It should also be appreciated that the 2% diesel pilot fuel resulted in less $NO_x$ being produced by the 3601 diesel engine as compared to the 3% diesel pilot fuel. This fact is represented by the 2% diesel pilot fuel curve (defined by the ♦ points) being located on the graph below the 3% diesel pilot fuel curve (defined by the ■ points).

Three tests were conducted on the emulsified pilot fuel. In the first test a 3% emulsified pilot fuel (depicted by the symbol □ in FIG. 3) was injected into the combustion chamber of the 3601 diesel engine so as to ignite the natural gas contained therein. In the second test, a 2% emulsified pilot fuel (depicted by the symbol ◊ in FIG. 3) was injected. In the third test, a 1.5% emulsified pilot fuel (depicted by the symbol ○ in FIG. 3) was injected. As described above in reference to the diesel pilot fuel, what is meant herein by the phrase "3% emulsified pilot fuel" is a quantity of the emulsified pilot fuel injected into the cylinder by the fuel injector which contains about 3% of the total amount of energy released by the combustion of the 3% emulsified pilot fuel and the natural gas in the combustion chamber of the 3601 diesel engine. This meaning applies to all of the percentage emulsified pilot fuels (e.g. 2% emulsified pilot fuel) referred to hereinafter.

The results of the 3% emulsified pilot fuel test, the 2% emulsified pilot fuel test, and the 1.5% emulsified pilot fuel is respectively shown below in Tables III, IV, and V:

TABLE III

| Excess Air Ratio | BSNO$_x$ (g/hp-hr) |
|---|---|
| 1.813 | 3.12 |
| 1.857 | 2.19 |
| 1.892 | 1.38 |
| 1.942 | 0.92 |
| 1.996 | 0.68 |

TABLE IV

| Excess Air Ratio | BSNO$_x$ (g/hp-hr) |
|---|---|
| 1.768 | 2.79 |
| 1.810 | 1.81 |
| 1.883 | 1.11 |
| 1.922 | 0.69 |
| 1.963 | 0.53 |

TABLE V

| Excess Air Ratio | BSNO$_x$ (g/hp-hr) |
|---|---|
| 1.737 | 2.64 |
| 1.795 | 1.67 |
| 1.858 | 1.01 |
| 1.927 | 0.64 |
| 1.952 | 0.46 |

The data contained in Tables III, IV, and V is graphically illustrated in FIG. 3. As shown in FIG. 3, the brake specific amount of NO$_x$ produced by the 3601 diesel engine showed a decreasing trend as the excess air ratio was increased for all three injection quantities (i.e. 3%, 2%, and 1.5%) of the emulsified pilot fuels. Moreover, it should be appreciated that each quantity of the emulsified pilot fuel resulted in less NO$_x$ being produced by the 3601 diesel engine as compared to either the 3% diesel pilot fuel or the 2% diesel pilot fuel. This fact is represented by all three injection quantities (i.e. 3%, 2%, and 1.5%) of the emulsified pilot fuel curves (defined by the □, ◊, and ○ points) being located on the graph below the 3% diesel pilot fuel curve and the 2% diesel pilot fuel curve (defined by the ■ and ♦ points, respectively).

It should be understood that each of the emulsified pilot fuels include an emulsion of diesel fuel in water (i.e. water as the continuous phase) at a water to fuel ratio of about 50% water by weight. As such, the volume of the 3% emulsified pilot fuel injection (curve defined by the □ points) is about twice that of the 3% diesel pilot fuel (curve defined by the ■ points) injection even though the 3% emulsified pilot fuel and the 3% diesel pilot fuel contain substantially the same amount of diesel fuel. Similarly, the volume of the 2% emulsified pilot fuel injection (curve defined by the ◊ points) is about twice that of the 2% diesel pilot fuel injection (curve defined by the ♦ points) even though the 2% emulsified pilot fuel and the 2% diesel pilot fuel contain substantially the same amount of diesel fuel.

It should also be understood that even though the 3% emulsified pilot fuel contains substantially the same amount of diesel fuel as the 3% diesel pilot fuel, igniting natural gas fuel within the combustion chamber with the 3% emulsified pilot fuel significantly reduces the brake specific amount of NO$_x$ produced by the 3601 diesel engine as compared to igniting natural gas fuel within the combustion chamber with the 3% diesel pilot fuel. This comparison is also true for the 2% emulsified pilot fuel and the 2% diesel pilot fuel. Specifically, igniting natural gas fuel within the combustion chamber with the 2% emulsified pilot fuel significantly reduces the brake specific amount of NO$_x$ produced by the 3601 diesel engine as compared to igniting natural gas fuel within the combustion chamber with the 2% diesel pilot fuel even though the 2% emulsified pilot fuel contains substantially the same amount of diesel fuel as the 2% diesel pilot fuel.

Therefore, it should be understood that utilizing an emulsified pilot fuel to ignite gaseous fuel such as natural gas within a combustion chamber of a diesel engine is an important aspect of the present invention since it significantly reduces the amount of NO$_x$ produced by the diesel engine as compared to igniting the gaseous fuel within the combustion chamber with a non-emulsified diesel pilot fuel.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of reducing production of nitrogen oxides during operation of an engine, with said engine having a combustion chamber, comprising the steps of:

advancing air into said combustion chamber;

advancing a gaseous fuel into said combustion chamber;

injecting an emulsified pilot fuel into said combustion chamber, wherein said emulsified pilot fuel includes water and liquid fuel; and compressing a mixture which includes (i) said air, (ii) said gaseous fuel, and (iii) said emulsified pilot fuel within said combustion chamber during a compression stroke of said engine, whereby heat generated by compression of said mixture causes said emulsified pilot fuel to combust so as to ignite said gaseous fuel.

2. The method of claim 1, wherein:

said emulsified pilot fuel comprises an emulsion of water in diesel fuel at a water to fuel ratio of about X% by weight, and $5 < X < 60$.

3. The method of claim 2, wherein $10 < X < 50$.

4. The method of claim 1, wherein said liquid fuel is a diesel fuel.

5. The method of claim 4, wherein said gaseous fuel includes natural gas.

6. The method of claim 1, wherein:

said emulsified pilot fuel includes a continuous phase and a discontinuous phase, said continuous phase consists essentially of said liquid fuel, and said discontinuous phase consists essentially of said water.

7. The method of claim 1, wherein:

said engine includes (i) a cylinder which defines said combustion chamber, (ii) an air intake conduit in fluid communication with said cylinder, (iii) a gas supply, and (iv) a gas admission valve operatively interposed between said air intake conduit and said gas supply, and said gaseous fuel advancing step includes said step of operating said gas admission valve so as to allow said gaseous fuel to advance from said gas supply to said combustion chamber during an air intake stroke of said engine.

8. A method of reducing production of nitrogen oxides during operation of an engine, with said engine having a combustion chamber, comprising the steps of:

advancing air and a gaseous fuel into said combustion chamber during an air intake stroke of said engine;

injecting an emulsified pilot fuel into said combustion chamber during a compression stroke of said engine, wherein said emulsified pilot fuel includes water and diesel fuel; and compressing a mixture which includes (i) said air, (ii) said gaseous fuel, and (iii) said emulsified pilot fuel within said combustion chamber during the compression stroke of said engine, whereby heat generated by compression of said mixture causes said emulsified pilot fuel to combust so as to ignite said gaseous fuel.

9. The method of claim 8, wherein:

said emulsified pilot fuel comprises an emulsion of water in diesel fuel at a water to fuel ratio of about X% by weight, and

5<X<60.

10. The method of claim 9, wherein 10<X<50.

11. The method of claim 8, wherein:

said emulsified pilot fuel includes a continuous phase and a discontinuous phase, said continuous phase consists essentially of said diesel fuel, and said discontinuous phase consists essentially of said water.

12. The method of claim 8, wherein:

said engine includes (i) a cylinder which defines said combustion chamber, (ii) an air intake conduit in fluid communication with said cylinder, (iii) a gas supply, and (iv) a gas admission valve operatively interposed between said air intake conduit and said gas supply, and said gaseous fuel advancing step includes said step of operating said gas admission valve so as to allow said gaseous fuel to advance from said gas supply to said combustion chamber during said air intake stroke of said engine.

13. The method of claim 8, wherein said gaseous fuel includes natural gas.

* * * * *